United States Patent [19]

Rose et al.

[11] Patent Number: 5,001,025

[45] Date of Patent: Mar. 19, 1991

[54] METHOD FOR ELECTROCHEMICALLY TREATING BATTERY PLATE STOCK AND RELATED PRODUCT

[75] Inventors: Michael V. Rose, Pittsburgh, Pa.; Norman Bagshaw, Stockport, England

[73] Assignee: Sealed Energy Systems, Inc., Pittsburgh, Pa.

[21] Appl. No.: 361,029

[22] Filed: Jun. 5, 1989

[51] Int. Cl.⁵ .......................................... H01M 10/12
[52] U.S. Cl. ..................................... 429/233; 204/2.1
[58] Field of Search ......................... 204/2.1; 429/233

[56] References Cited

U.S. PATENT DOCUMENTS

| | | | |
|---|---|---|---|
| 3,647,548 | 3/1972 | Anderson et al. | 204/2.1 |
| 3,754,994 | 8/1973 | Roach | 136/34 |
| 3,853,626 | 12/1974 | Daniels et al. | 136/36 |
| 3,862,861 | 1/1975 | McClelland et al. | 136/26 |
| 3,904,433 | 9/1975 | Frazier | 136/14 |
| 4,081,899 | 4/1978 | Thornton et al. | 29/623.2 |
| 4,140,589 | 2/1979 | Hradcovsky et al. | 204/2.1 |
| 4,271,586 | 6/1981 | McCartney | 29/623.5 |
| 4,342,342 | 8/1982 | Wheadon | 141/1.1 |
| 4,349,067 | 9/1982 | Wirtz et al. | 164/479 |
| 4,401,730 | 8/1983 | Szymborski et al. | 429/53 |
| 4,415,016 | 11/1983 | McClane et al. | 164/429 |
| 4,461,677 | 7/1984 | Katan et al. | 204/2.1 |

Primary Examiner—Stephen J. Kalafut
Attorney, Agent, or Firm—Arnold B. Silverman

[57] ABSTRACT

A method of electrochemically forming battery plate stock spaces are provided between portions of the battery stock which may be in coil form and have gaps between adjacent wraps. Forming is preferably accomplished in a forming tank with a forming element such as an electrode or coil of opposite polarity being positioned in spaced relationship with respect to the edge of the battery plate stock. The battery plate stock is subsequently severed into individual battery plates.

28 Claims, 6 Drawing Sheets

METHOD FOR ELECTROCHEMICALLY TREATING BATTERY PLATE STOCK AND RELATED PRODUCT

BACKGROUND OF INVENTION

1. Field of Invention

This invention relates to an improved method of electrochemically treating electrodes used in the manufacture of lead-acid batteries and an associated product. More specifically, the invention relates to a method of electrochemically forming lead-acid battery plate stock in configurations which can be utilized to automate the battery production process.

2. Description of the Prior Art

The lead-acid battery is well known as a rechargeable power source for automotive starting, standby power, vehicular traction, emergency lighting, powering portable tools and appliances, and many other applications requiring a remote and renewable source of electricity. Regardless of application, the conventional battery generally consists of a plurality of positive and negative electrodes which are electrically insulated from one another by a porous separator and immersed in a sulfuric acid electrolyte. The electrodes may be in the form of flat plates, tubes, rods, or spiral-wrapped sheet or strip, or combinations thereof. The vast majority of lead-acid batteries contain flat positive plates and flat negative plates which are made by applying a leady oxide paste to a grid structure made of lead or a lead alloy.

Worldwide, hundreds of millions of flat-plate lead-acid batteries of all types are produced. As each unit contains a multitude of battery plates, even a moderately-sized manufacturer must produce and handle tens of millions of plates per year, each containing lead-based compounds which present a potential hazard. As a result, battery producers are attempting to automate the manufacturing process in order to reduce costs and minimize worker exposure.

The process of making a flat lead-acid battery plate having suitable electrochemical characteristics involves the steps of (1) applying a layer of a paste (normally containing a mixture of leady oxide, sulfuric acid and water) to a lead-based grid structure containing a reticulated grid portion and a grid border portion or portions; (2) curing the resulting pasted plate in order to (i) convert any free lead to lead oxide, (ii) generate a lead sulfate crystal structure which optimizes plate performance, (iii) strengthen the interface between the paste and the grid, and (iv) improve the overall strength of the plate; and (3) electrochemically forming the plate in order to convert the active material on the positive plate to lead dioxide and to convert the active material on the negative plate to sponge lead, thereby yielding the compositions and structures required for the efficient generation of power when the plates are brought into contact with the sulfuric acid electrolyte.

The most common method of producing flat-plate lead-acid battery plate stock involves casting lead-alloy grids using semi-automated permanent mold casting machines, such as those marketed by the Wirtz Manufacturing Company.

The as-cast grid panel normally contains two grids, although it may consist of only one grid of a larger size or a large number of grids of a smaller size.

After trimming, the grid panel enters a belt pasting machine, which may be of a type such as that marketed by the MAC Engineering Company, in which the interstices of the grid are filled with battery paste.

Upon exiting the paster, the pasted grid panel is passed through an oven in which it is flash dried. Curing of the dried pasted plate stock is normally carried out in a chamber equipped to provide control of temperature and humidity.

Electrochemical formation of the cured battery plate stock is normally achieved by either tank formation or box formation. One known method of tank formation, described in U.S. Pat. No. 3,754,994, involves suspending double-plate positive panels alternately with double-plate negative panels in the forming acid in such a manner that, except for the outer surfaces of the end plates, each pasted positive plate surface faces, and is oriented essentially parallel to, a pasted negative plate surface of approximately equivalent surface area. All panels of the same polarity are electrically connected in parallel. After formation, the formed battery plate stock is washed and dried, and the double panel is then divided into individual plates which are used in manufacturing the battery. This method involves repeated handling of a very large number of individual components at each step in the process and is costly, inefficient, and makes it difficult to achieve desired environmental control. Tank formation is also referred to as the dry charge process.

The known alternative of box formation, versions of which are described in U.S. Pat. No. 4,081,899 and U.S. Pat. No. 4,401,730, involves constructing the battery from cured plates prior to formation and performing the formation process in the battery case. The finished battery is generally constructed in a manner such that, except for the outer surfaces of the end plates, each pasted positive plate surface faces, and is essentially parallel to, a pasted negative plate surface of approximately equivalent surface area, so that the relative position of the positive and negative battery plate stock during box formation is the same as that which occurs during tank formation. Accordingly, box formation, like tank formation, involves the undesirable repeated handling of a very large number of plates prior to being able to form the battery.

Recent developments in lead-acid battery manufacture, such as the continuous grid casting process described in U.S. Pat. No. 4,349,067 and U.S. Pat. No. 4,415,016, and the metal expansion process described in U.S. Pat. No. 3,853,626, have made it possible to produce continuous lengths of battery grid stock which can be passed directly into a continuous pasting machine, as described in U.S. Pat. No. 4,271,586, or which can be coiled and stored prior to being pasted. Regardless of the form in which the starting stock enters the continuous paster, and although it is known to be possible to coil a continuous length of battery plate stock as it exits the paster, as described in U.S. Pat. No. 4,342,342, it is general practice to cut the continuous battery plate stock exiting the paster into individual plates or plate doubles for subsequent curing and, if cured in coil form, to cut the cured battery plate stock into plates to facilitate use in either the tank formation process and the box formation process. Dividing the continuous battery plate stock at this point in the process results in inefficient handling during formation which, in turn, prevents efficient automation of the cell assembly operation.

U.S. Pat. No. 3,862,861 discloses a cell construction and associated manufacturing method by which battery plate stock is box formed in a coiled configuration. The cell described therein consists of a length of positive plate stock, a length of negative plate stock, and a length of porous separator material juxtaposed between the two such that the pasted surface of said length of positive plate stock is opposed to the pasted surface of the negative plate stock. The cell is prepared by coiling the three-piece composite to form a "jelly-roll" structure which is placed in a battery container and box formed. As in tank formation and box formation of flat battery plates, this method involves forming a configuration in which the pasted surface of a positive plate faces, and is oriented generally parallel to, the pasted surface of a negative plate of similar surface area. Further, the method disclosed is applicable solely to the production of small, single cells and results in a structure in which the positive and negative plate stock are intertwined with separator to form a three-piece composite. As such, this technique is not readily employable to produce large coils of singular polarity.

None of these prior art formation techniques are adapted for the formation of a large, "stand-alone" coil of formed battery plate stock of singular polarity which is a configuration desired for the high-speed, automated production of lead-acid batteries. There remains, therefore, a need for a practical method of tank formation of continuous lengths of battery plate stock in coil form which would facilitate automated cell assembly and result in further improvements in battery production economics, product quality, and worker safety.

SUMMARY OF INVENTION

The present invention has met the hereinabovedescribed need.

The invention provides a method for electrochemically forming continuous lengths of battery plate stock of singular polarity in coil form. The coil is preferably configured in such a manner that the pasted surfaces of adjacent laps are not in physical contact with one another. The surfaces are separated from one another sufficiently to form a channel that can receive forming acid and through which gases generated during the formation reaction can escape.

The method preferably involves electrochemically forming the coil against an auxiliary electrode or a coil of opposite polarity in such a manner that the surface of said auxiliary electrode or coil of opposite polarity that is closest to the coil undergoing formation is located generally opposite an edge surface of said coil being formed and is electrically insulated therefrom.

It is an object of the present invention to provide a manufacturing process for the tank formation of continuous lengths of battery plate stock in coil form.

It is a further object of the invention to make formed battery plate stock in a configuration which facilitates automation of the cell assembly process.

It is a further object of the invention to provide a means of reducing the cost of producing lead-acid batteries and the environmental hazards inherent therein.

It is a further object of the invention to provide formed plate stock of improved consistency and quality relative to plate stock processed in the form of a multitude of individual plates or plate doubles.

It is a further object of this invention to provide a method of making a lead-acid battery of improved quality and consistency.

It is a further object of this invention to provide an electrochemically formed continuous length of battery stock.

These and other objects of the invention will be more fully understood from the following detailed description of the invention on reference to the illustrations appended hereto.

DESCRIPTION OF THE PREFERRED EMBODIMENTS

FIGS. 1 through 5 illustrates the structure and configuration of the continuous length of battery plate stock that may be employed as the starting material for the method of this invention. In general, the expression "continuous length of plate stock" as employed in describing the present invention will refer to plate stock of sufficient size that a plurality of battery plates may be obtained therefrom by severing the stock at predetermined lengths. It will generally be most advantageous to provide sufficient stock to permit at least ten plates to be severed therefrom.

Figure 1:
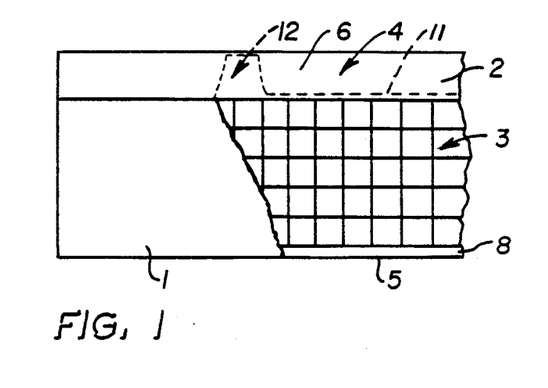
FIG. 1 is a fragmentary partially schematic front elevational view of pasted plate stock.
Figure 2:
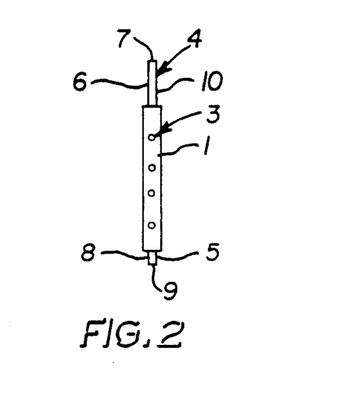
FIG. 2 is a right side elevational view of the plate stock of FIG. 1.

Referring more particularly to FIGS. 1 and 2, the starting continuous length battery plate stock consists of a layer of battery paste 1 (of a composition selected to achieve the desired polarity of the plate stock after formation) which has been applied to a continuous length of battery grid strip 2. The grid strip 2 consists of a reticulated grid portion 3, a lug portion 4, and a bottom border portion 5. The lug portion 4 has side surfaces 6 and an edge surface 7. The bottom border portion 5 consists of a side surface 8 and an edge surface 9.

The paste layer 1 is applied to the entire surface of the reticulated grid portion 3 and may extend in width beyond both side surfaces of said reticulated grid portion as a result of its being overpasted on both sides as shown in FIG. 2. In the alternative, the paste may be flush with one of the side surfaces while extending beyond the opposite surface (overpasted on one side); or be flush with both of the side surfaces so as to be flush pasted.

Most of the side surfaces 6 of the lug portion 4 are free of paste, although the paste layer may cover a small portion of the side surfaces 10 disposed adjacent to the region of connection with the lug portion 4 and the reticulated grid portion 3, as shown in FIG. 2, to effect good electrical contact between said paste layer 1 and said lug portion.

The lug portion 4 may be continuous and of constant width along the length of the grid strip 2, as shown in FIG. 1, or may consist of a top border portion 11 with a number of plate lugs 12 projecting therefrom and spaced periodically along the length of the continuous grid stock, as illustrated in the fragmented lines in FIG. 1. The thickness of the lug portion 4 may be greater than, equal to, or less than the thickness of the paste layer 1 as desired. It will be appreciated that the side surfaces 7 of the lug portion 4 would be generally free of paste. The side surface 8 of the bottom border 5 may be covered by the paste layer 1 or may be free of paste as desired. It is preferred, however, that the edge surface 9 of said bottom border be substantially free of paste.

The number, size, shape, and pattern of the grid wires making up the reticulated grid portion 3 may be of any desired configuration suitable for use in the manufacture of battery plates. The continuous battery grid strip 2 may be produced by continuous casting, metal expansion of as-cast or wrought sheet, or by any other suitable process used for the production battery grid stock in relatively continuous form. All of these parameters will be well known to those skilled in the art.

Figure 3:
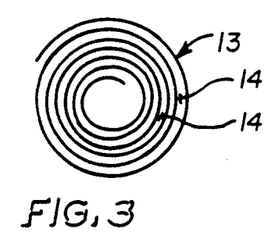
FIG. 3 is an end view of a coil of pasted plate stock.
Figure 4:
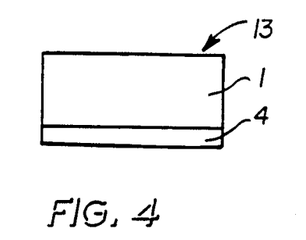
FIG. 4 is a front elevational view of the coil of FIG. 3.
Figure 5:
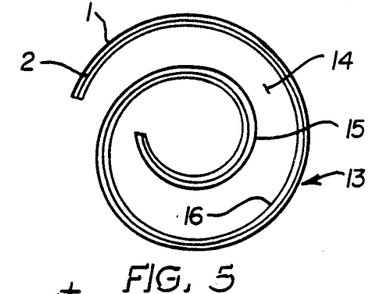
FIG. 5 is a schematic fragmentary expanded view of the coil of FIGS. 3 and 4.

Referring to FIGS. 3 through 5, the battery plate stock to be electrochemically formed is configured in the form of a coil 13 which has been wound in a manner such that the surfaces 15, 16 (FIG. 5) of the paste layer 1 of adjacent wraps are portions which are not in physical contact with one another, thereby leaving a space 14 between wraps into which forming acid can flow and through which gases generated during the forming operation can escape. The coil 13 having such spacing between adjacent wraps may be prepared by such means, for example, as coiling loosely to leave a space between wraps, coiling onto a surface containing a spiral slot into which the continuous length of battery plate stock can be fitted, coiling onto a surface containing protrusions located in a spiral pattern around which the continuous length of battery plate stock can be wrapped, providing a plurality of spacer bars (oriented generally parallel to the axis of rotation) around the circumference of each coil wrap as said coil is wound, or by any other means which provides the desired gap between the pasted surfaces 15, 16 of adjacent wraps.

In another embodiment of the invention, the spacing between the pasted surfaces 15, 16 of adjacent wraps may be achieved by placing a layer of porous, acid absorbing material of the desired thickness between adjacent wraps. In this instance, the spacer material may contact part or all of the surface area of the pasted surfaces 15, 16 of adjacent wraps.

In either embodiment of the invention, the space between the pasted surfaces 15, 16 of adjacent wraps must be sufficient to permit an acid layer to be maintained between the wraps during formation. The space may be on the average about 0.005 to 1 inch with an average space of about 0.020 to 0.250 inch being preferred. The maximum space between adjacent wraps is controlled by the maximum size of the coil that can be handled and the total length of the battery plate stock desired on each coil.

Electrochemical formation of such a coil is accomplished in a bath of sulfuric acid by forming against a structure of opposite polarity. The coils of positive polarity are converted to lead dioxide by the forming operation and forming of the coils of negative polarity converts the material to lead sponge. In one embodiment of the invention shown in FIG. 6, the coil 13 is formed against an auxiliary (or dummy) electrode 17 of opposite polarity positioned relative to said coil 13 such that the surface 17A of said auxiliary electrode closest to said coil is adjacent to an edge 13A of said coil and is electrically insulated therefrom. It is preferred that the active surface 17A of the auxiliary electrode 17 will be positioned generally perpendicular to the pasted plate surfaces 15 and 16 (FIG. 5) of the adjacent wraps of the coil 13, although formation may still be achieved if perpendicularity is not attained. Any means of achieving electrical insulation may be used, including but not limited to a physical gap 18 between electrode 17 and coil 13; or positioning a porous acid-absorbing insulating separator between coil 13 and said auxiliary electrode 17, so long as a layer of forming acid sufficient to carry the forming current is maintained between said coil 13 and said auxiliary electrode 17.

The electrical connection to the coil 13 may conveniently be made to the edge surface 7, or the side surface 6 of the lug portion 4 (FIGS. 2 and 6), or to the edge surface 9 or side surface 8 of the bottom border portion of said coil (FIG. 2). Connection to the edge surface 7 of the lug portion 4 is preferred.

Figure 7:
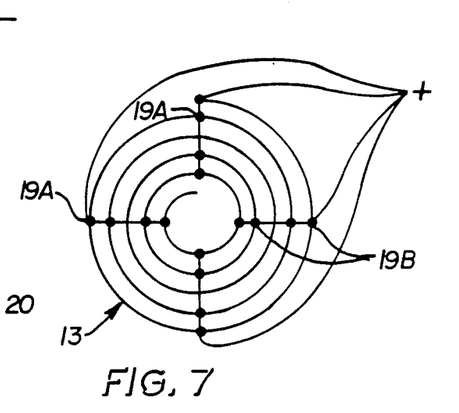
FIG. 7 is a schematic illustration of a form of electrical connection usable in the invention.

To improve the efficiency of formation and the uniformity of the formed battery plate stock, it is preferred that the electrical connection between the coil 13 and the formation power supply (not shown) be made at a number of points 19A around the circumference of a wrap of the coil 13 (FIG. 7) and to a number of the individual wraps which, collectively, make up the width of said coil 19B, as shown in FIG. 7. The electrical connections may be made by mechanical contact between said coil and an acid-resistant electrical conductor or by attaching said acid-resistant electrical conductor to said coil by welding, soldering, or some other suitable means.

Figure 6:
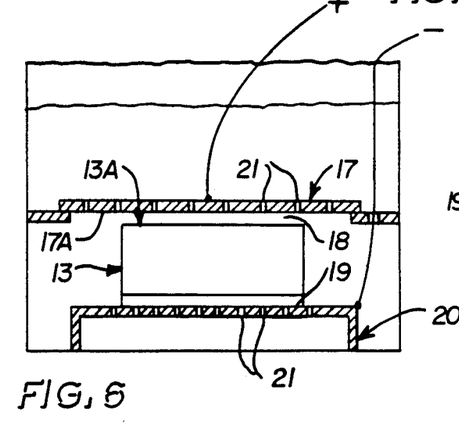
FIG. 6 illustrates schematically the use of an auxiliary electrode in practicing one embodiment of the method of this invention.

A preferred method of attaining a uniform current distribution throughout the coil 13 during forming is to place the coil 13 in intimate contact with an electrically conductive acid-resistant surface 19, such as that of an electrically conductive pallet 20, shown in FIG. 6, which may also be used to support and convey the coil 13 during processing. When coil 13 is positioned with either the continuous lug portion 4 or the continuous bottom portion 5 in contact with the surface 19 of said conductive pallet 20 most, if not all, of the wraps of said coil will be in contact with the conductive surface 19 of said pallet 20 around all, or most, of the circumference of the individual wraps of said coil 13. This extensive contact results in a generally uniform current distribution throughout the coil 13. In the case of a coil of a continuous length of battery plate stock having a top border portion 11 and lugs 12 (FIG. 1) spaced periodically along the length of said battery plate stock, the use of a conductive pallet would result in most, if not all, of the lugs being in intimate contact with the conductive surface of said pallet. Tack welding, soldering, or binding the coil 13 intimately to the pallet, for example, are methods which may be used to reduce the electrical resistance at the region of contact between the coil 13 and the pallet 20. To improve acid circulation and electrical efficiency, it is preferred that the electrically conductive pallet 20 and the auxiliary electrode 17 contain a plurality of passages 21 through which acid can circulate. The container in which the formation process is performed may be constructed of any material that resists attack by sulfuric acid, and is strong enough to support the weight of the acid and the material being formed. These materials may, for example, be polyvinyl chloride, reinforced epoxy, polyethylene, and polypropylene. Other materials, as well as the means of adding and removing acid, will be well known to those skilled in the art.

Although it is preferred that the coil 13 and auxiliary electrode 17 be positioned such that the axis of the coil is generally vertical with the coil 13 positioned beneath the auxiliary electrode 17 as shown in FIG. 6, formation may also be achieved with the coil 13 positioned above the auxiliary electrode 17 or with the coil 13 disposed in spaced relationship or between two auxiliary electrodes of the same polarity. The pallets 20 and electrodes may be made of any electrically conductive material which resists attack by sulfuric acid such as, lead and lead alloys, and titanium and titanium alloys, for example.

Figure 8:
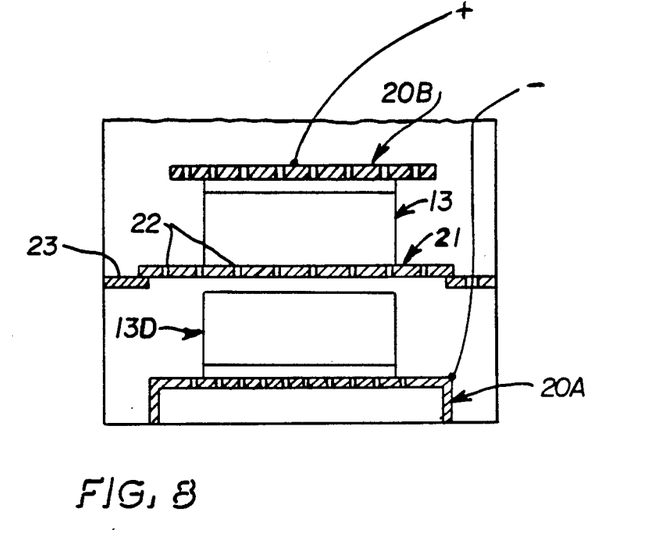
FIG. 8 illustrates schematically the use of a second coil in practicing a second embodiment of the method of this invention.

In another embodiment of the invention, shown in FIG. 8, one coil 13 of continuous battery plate stock can be formed against a second coil 13D of continuous battery plate stock of opposite polarity. In this embodiment, the coils 13, 13D are positioned "edge-to-edge" with the axis of one coil generally parallel to or aligned with the axis of the opposing coil and an edge of one coil opposite an edge of the opposing coil. In the specific configuration shown in FIG. 8, a coil 13D of negative battery plate stock has been positioned with its lug portion down beneath a coil 13 of positive battery plate stock which has been positioned with its lug portion up, the coil 13D of negative battery plate stock 15 in intimate contact with the surface of an electrically conductive pallet 20A connected to the negative terminal of the formation power supply (not shown). The spacing between coils 13 and 13D is preferably about 0.010 to 1 inch measured from coil edge to coil edge, and coil 13 of positive battery plate stock is in intimate contact with the surface of a conductive pallet 20B connected to the positive terminal of the formation power supply. The power supply may be any one of a number of commercially available units such as those sold by Bitrode corporation which supply the amount of D.C. current required to complete the formation reaction in the desired period of time.

FIG. 8 shows the coil 13 of positive plate stock supported by a non-conducting plate or lattice structure 21 which contains a plurality of openings 22 to facilitate acid circulation and which, in turn, is supported by an annular shelf of the forming tank 23. The electrically conducting pallets 20A, 20B also contain openings which facilitate acid circulation through the pallets 20A, 20B and along the passages resulting from the spaces between adjacent wraps of both coils 13, 13D. Formation is achieved by passing the desired amount of direct current through the circuit for the required amount of time at a temperature selected to optimize efficiency and product quality. Typically, a coil containing 500 pounds of positive active material being formed at 185 ampere hours per pound for a period of 48 hours at a temperature in the range of 110° F.–120° F. requires an average current of 1,920 amperes. Upon completion of formation and removal from the formation tank, the coils 13, 13D may be washed and dried using procedures that are well known to those skilled in the art.

If desired two coils of the same polarity may be positioned on opposite sides of a third coil of opposite polarity in effecting formation in a manner otherwise generally similar to that shown in FIG. 8.

While for convenience the above discussion and illustrations have made reference to specific configurations, polarities, and conditions of formation, it will be apparent to those skilled in the art that one may practice the invention with the position of the positive and negative coils or electrode reversed and employing other configurations and conditions.

The following examples provide specific preferred practices in employing methods of this invention.

EXAMPLE 1

This example illustrates that satisfactory formation can be achieved when the battery plate stock being formed is oriented such that one edge of said battery plate stock is located opposite the active surface of the body against which it is being electrochemically formed, a configuration which is required for forming continuous battery plate stock in coil form.

Figure 9:
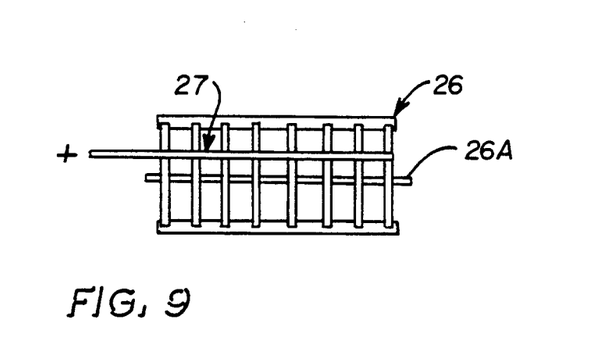
FIGS. 9 and 10 are respectively schematic top plan and front elevational views of a first experimental system.
Figure 10:
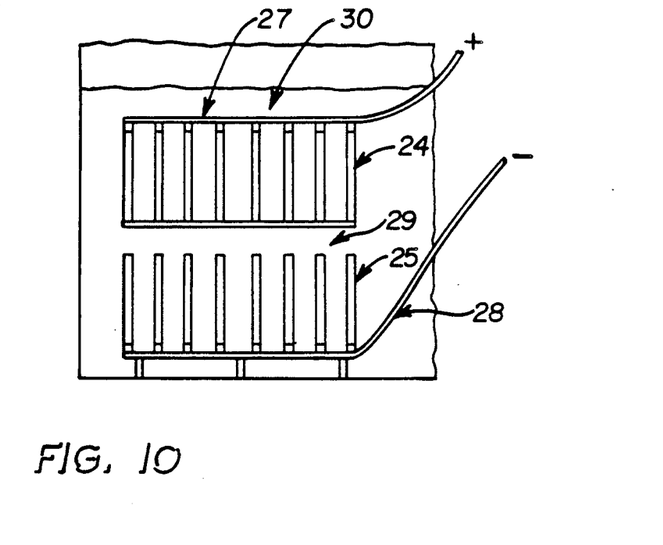

Referring to FIGS. 9 and 10, sixteen individual as-cured positive battery plates 24 were formed against 16 dummy negative battery plates 25 in an edge-to-edge configuration. The positive plates, which measured approximately 1.79" long × 1.26" high × 0.077" thick were made by applying a standard positive industrial battery paste grade to grids which had been cast from a standard lead-calcium grid alloy, MF-903. The negative plates, which measured 1.79" long × 1.26" high × 0.067" thick, were made by applying a standard industrial negative battery paste grade to the same grid alloy. The positive plates each contained about 8.3 grams of cured paste. The negative plates each contained about 7.4 grams of cured paste.

The sixteen positive plates 24 were placed in slotted fixtures 26, which positioned the plates generally parallel to one another and spaced approximately 3/16" inch apart as measured between closest surfaces. The plates 24 were positioned with the lug portion of each plate projecting upwards and all of the plates 24 were electrically connected in parallel by soldering a lead alloy wire 27 to the lug of each plate. The wire 27 was connected to the positive terminal of the formation power supply. The plates 24 rested on a plastic support 26A which is attached to fixture 26.

The positive plates 24 were positioned above similar slotted fixtures which held the sixteen dummy negative plates 25 generally parallel to one another and spaced approximately 3/16" inch apart. The lug portion of the negative plates 25 projected in a downwards direction. The negative plates 25 were electrically connected in parallel by soldering a lead alloy wire 28 to the lug on each plate 25. The wire 28 was connected to the negative terminal of the formation power supply. The gap 29 between the positive plates 24 and negative plates 25 was approximately ¼" inch.

The plates 24, 25 were formed in a bath 30 containing approximately 3,000cc of 1.06 S.G. sulfuric acid which was maintained at a temperature in the range of about 108° F. and 122° F. Five pairs of positive and negative plates were formed to a level of approximately 155 amperehours/pound of positive paste, five pairs were formed to a level of approximately 168 ampere-hours/pound of positive paste, and six pairs were formed to a level of approximately 174 ampere-hours/pound of positive paste, using the formation cycle shown in Table 1.

TABLE 1

| TIME (HOURS) | AVERAGE FORMING CURRENT | TOTAL AMP-HOURS |
| --- | --- | --- |
| 2.0 | 2.4 | |
| 1.8 | 5.7 | |
| 1.3 | 4.9 | |
| 1.7 | 3.8 | |
| 0.5 | 1.4 | |
| 14.0 | 1.2 | |
| 0.3 | 0.8 | 45.6 |
| FIRST 5 PAIRS OF PLATES REMOVED | | |
| 3.0 | 0.8 | |
| 2.5 | 0.5 | 49.3 |
| SECOND 5 PAIRS OF PLATES REMOVED | | |
| 5.0 | 0.4 | 51.3 |
| REMAINING 6 PAIRS OF PLATES REMOVED | | |

The plates so formed were washed using standard procedures and dried for 18 hours in vacuum at a temperature of approximately 90° C. (194° F.).

The positive plates 24 processed in accordance with the above procedure were combined with negative plates which had been tank formed using a more conventional procedure to build sealed cells having a target capacity of 1.25 amperehours when discharged at 5 amperes at the 15- minute rate. Three cells were constructed, each incorporating four positive plates (formed to the same level, as described hereinabove), three negative plates, standard AGM fiberglass mat separators, and 1.28 S.G. sulfuric acid as the electrolyte. Each cell was placed on a float charged at 2.35V for approximately 36 hours prior to testing. The cells were discharged at a constant current of 5 amperes, charged under constant voltage conditions at 2.38V for approximately 11 hours and then cycled using the same discharge current and charging regime in accordance with a standard cycle test regime employed in testing cells of this type.

Figure 11:
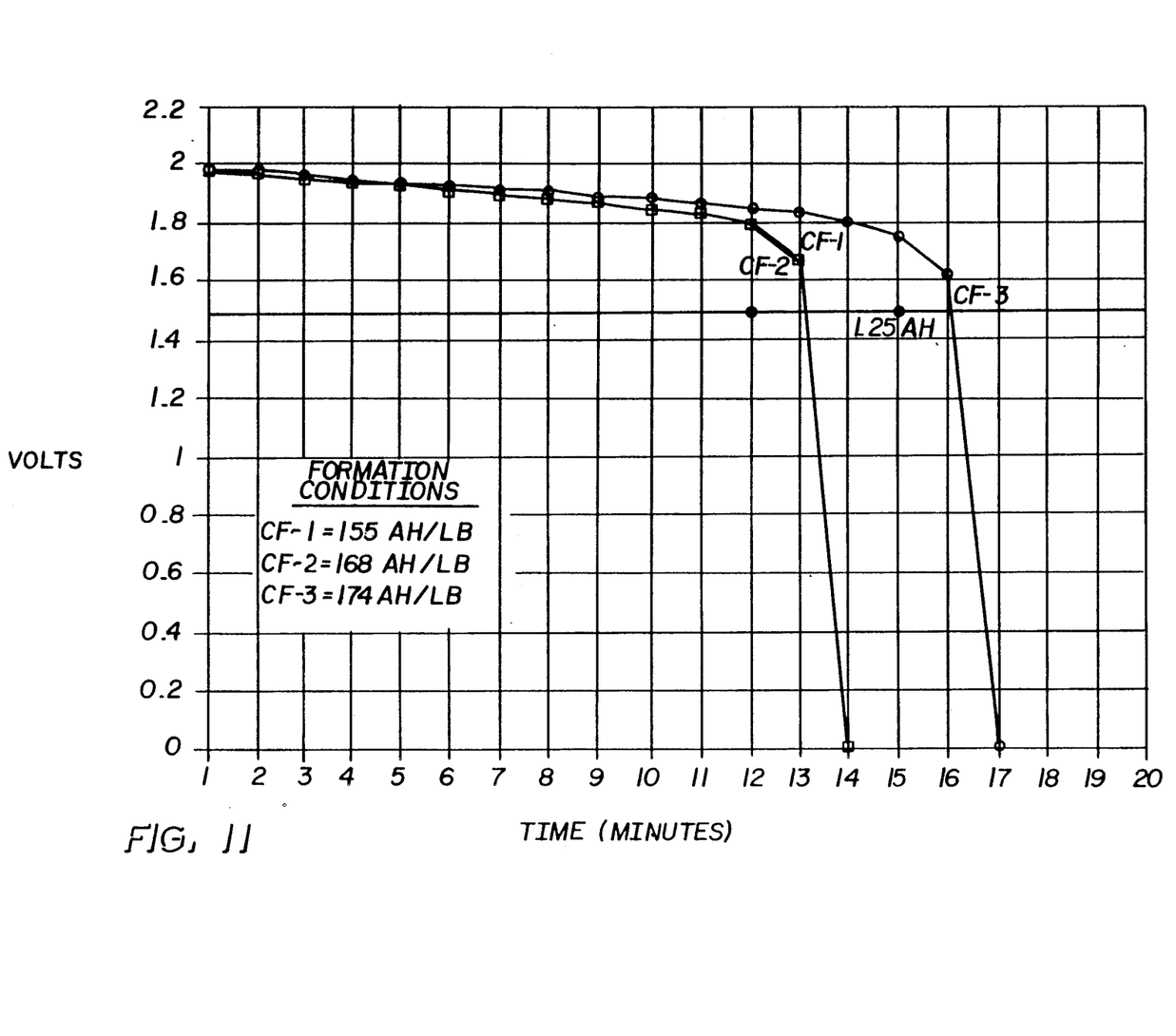
FIGS. 11 and 12 are plots of discharge curves showing voltage versus time for several test cells.
Figure 12:
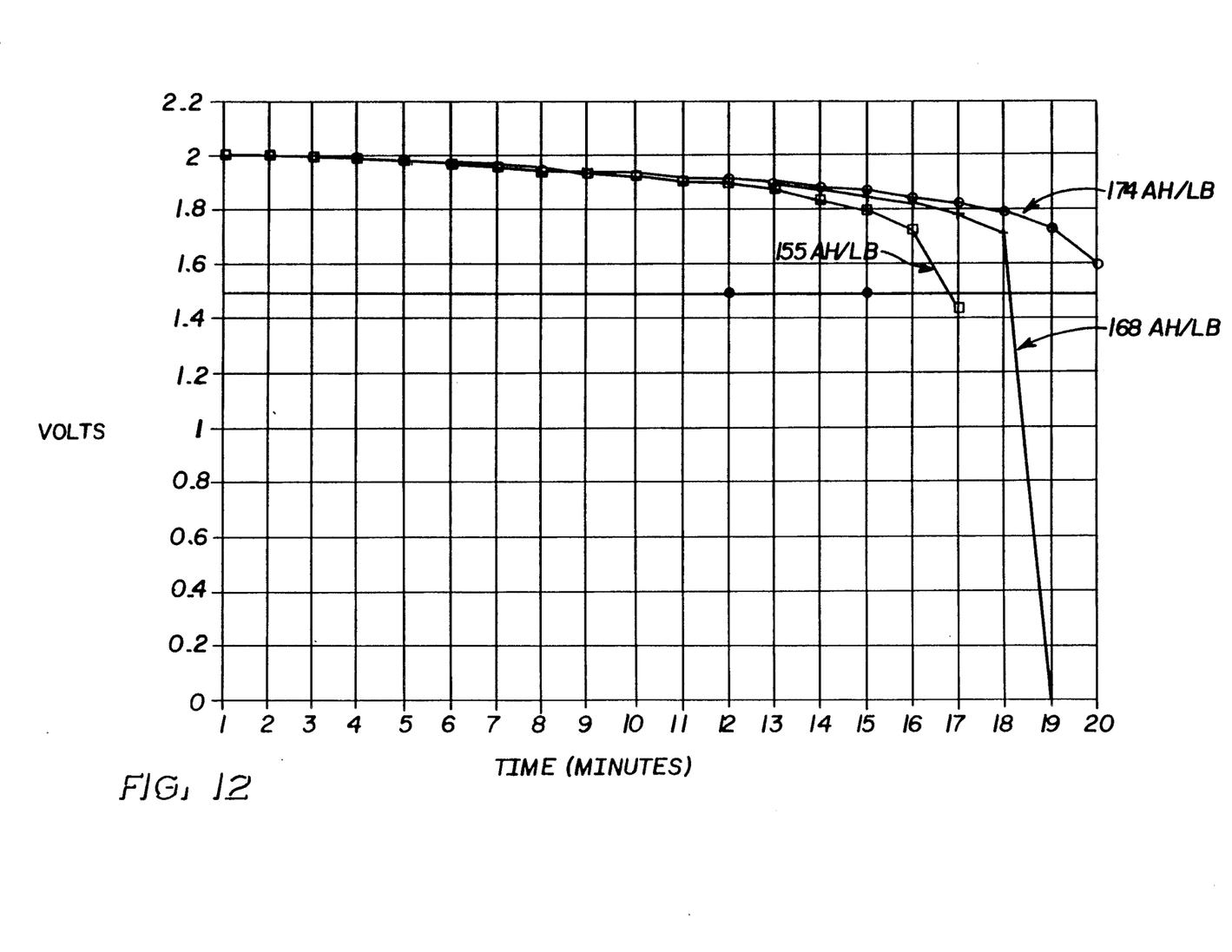

The results of the capacity and cycle tests, illustrated as discharge voltage versus time in minutes for the first discharge cycle and ninth discharge cycle are shown in FIGS. 11 and 12 respectively, FIG. 11 shows that the cell (CF-3) formed to a level of 174 ampere-hours/pound attained the target capacity on its initial discharge cycle and FIG. 12 shows that both of the other cells reached target capacity within the nine cycles. All cells continued to gain in capacity with repeated cycling, with the cell (CF-2) containing plates formed to a level of 168 amperehours/pound reaching a capacity of 2.0 ampere-hours at the twentieth cycle. These data illustrate that lead-acid battery plate stock, formed in accordance with the method of this invention, attain the desired capacity level and were of excellent quality.

EXAMPLE 2

This example illustrates that satisfactory formation can be achieved in continuous lengths of battery plate stock in coil form and that a coil of continuous positive battery plate stock can be formed against a coil of continuous negative battery plate stock when the coils are juxtaposed edge-to-edge.

Figure 13:
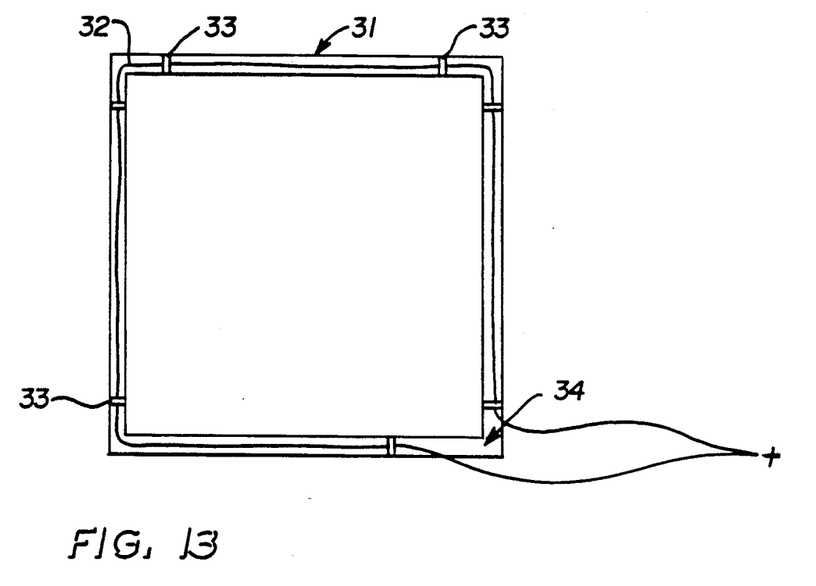
FIGS. 13 and 14 are respectively top and front elevational views of a second experimental system.
Figure 14:
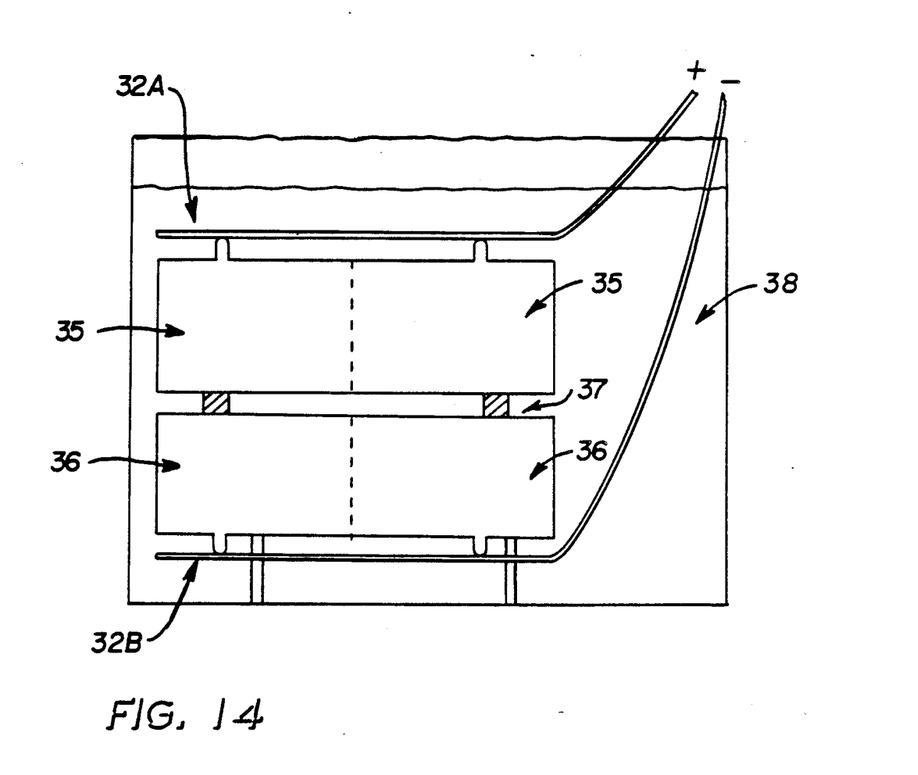

Two concentric squares of positive plate stock, positioned to maintain a physical gap between adjacent pasted surfaces and connected electrically is parallel in order to simulate two adjacent wraps of a coil of continuous positive battery plate stock having a space between wraps, were formed against two concentric squares of negative plate stock of similar configuration and electrical connection intended to simulate two adjacent wraps of a coil of continuous negative battery plate stock having a space between wraps, as illustrated in FIGS. 13 and 14. The sides of the outside squares 31 measured approximately 3.6" inch and each side contained two full 1.79" long × 1.26" high battery plates. The four sides of each outside square were connected electrically by lead 32 and the outside square was electrically connected in parallel to the inside square of the same polarity by connectors 33. The sides of the inside squares measured approximately 3.4" inch and each contained one full-size battery plate. The four sides of each inside square were also connected electrically. The gap 34 between the inside and outside squares was maintained at approximately 0.030 inch–0.060 inch. The thickness of the positive plate stock 35 was 0.077" inch. The thickness of the negative plate stock 36 used was 0.067" inch. The total weight of positive active material in the assembly was approximately 127 grams. The total weight of negative active material in the assembly was 117 grams. The gap 37 between the squares of positive polarity and the squares of negative polarity was approximately ⅛" inch. The positive plate stock was connected to the positive terminal of the formation power supply (not shown) by lead 32A (FIG. 14) and the negative plate stock was connected to the negative terminal of the power supply by means of lead 32B.

The simulated coils were formed to a level of approximately 185 ampere-hours/pound in bath 38 of 1.06 S.G. sulfuric acid maintained in the temperature range of about 112° F. to 118° F. Formation was carried over a period of 29.3 hours in accordance with Table 2.

TABLE 2

| Time (Hours) | Average Forming Current Amperes |
| --- | --- |
| 2.25 | 2.08 |
| 3.00 | 5.92 |
| 1.12 | 5.00 |
| 0.45 | 2.63 |
| 0.25 | 1.52 |
| 22.25 | 0.96 |

After formation, the simulated coils were washed using standard procedures and dried in vacuum for 18 hours at approximately 90° C. (194° F.). After drying, positive battery plates cut from the positive plate stock were combined with negative plates cut from the negative plate stock to form a single cell. The cell contained four positive plates and three negative plates formed in accordance with the method of this invention. The construction of the test cell was basically the same as that described in Example 1. The cell was given a 17-hour booster charge at 2.45 volts before testing and then cycled using a 5-ampere discharge to a 1.50V cut-off followed by charging for approximately 7.1 hours at a constant voltage of 2.45 volts.

Figure 15:
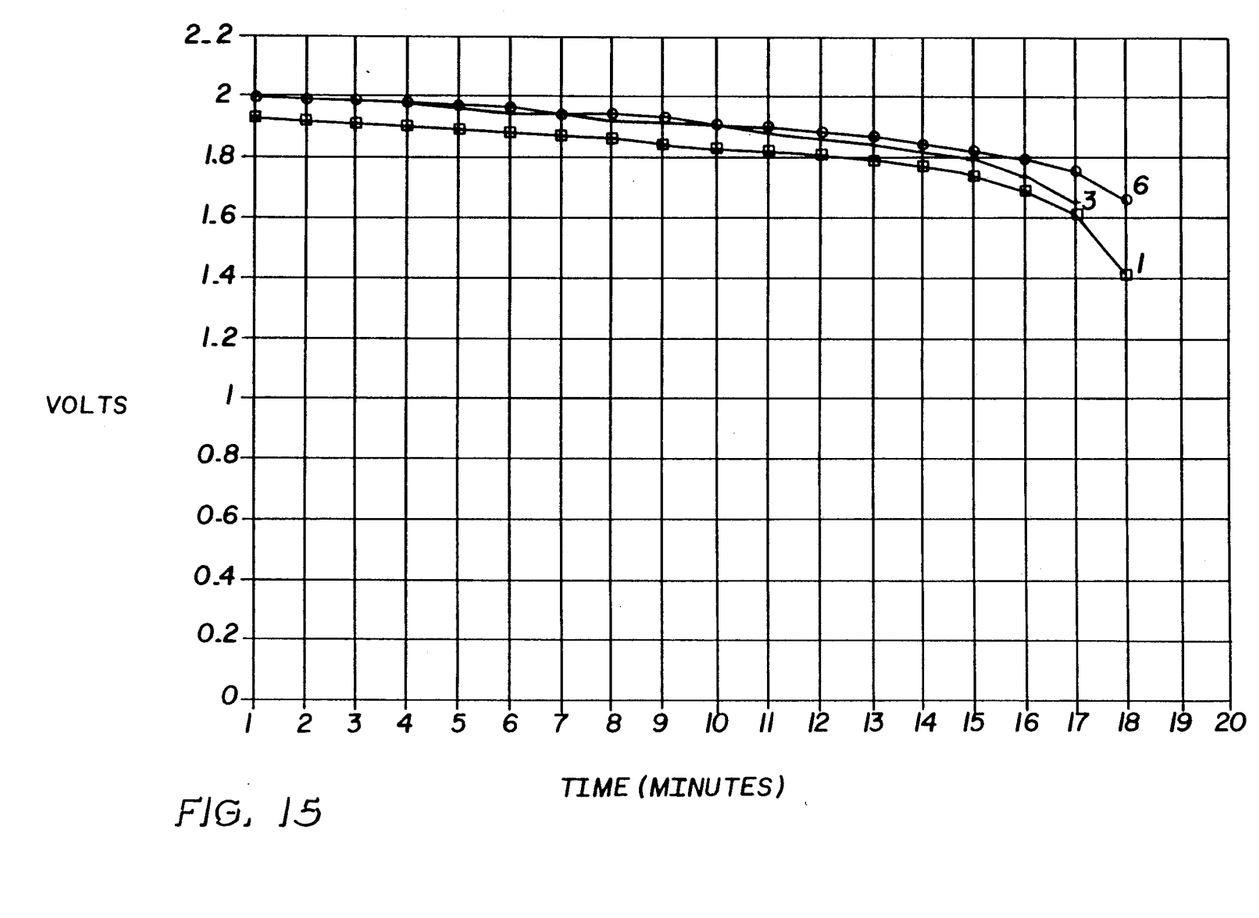
FIG. 15 is a plot of discharge curves showing voltage plotted against time for a test cell prepared by means of the second experimental system.

As can be seen from the test results illustrated in FIG. 15 the cell containing plates formed in accordance with the method of this invention attained the desired capacity on its first discharge and continued to increase in capacity with subsequent cycling. These data confirm that the method of this invention may be used to produce high quality coils of continuous battery plate stock of a single polarity.

The coils of positive battery plate stock and negative battery plate stock produced in accordance with the method of this invention may be used as feedstock for the automated production of lead-acid batteries and cells. In machinery of this type, the coil stock is fed into a cutting device in which it is cut to the battery plate size required. The cut plate is transported automatically into the cell making portions of the machine in which it is alternately stacked with separators and plates of opposite polarity to form a cell of the desired configuration and capacity.

It will be appreciated that the method of this invention provides an efficient means for forming battery electrode stock in coil form in a manner which is consistent with use in an automated system for battery production and the resultant product.

It will be appreciated that while for convenience of disclosure herein reference has been made to a continuous length of battery plate stock in coil form other shapes and arrangements will be apparent to those skilled in the art. For example, an elongated strip having a series of folds provided with spaces between adjacent portions may be employed.

Whereas particular embodiments of the invention have been described herein for purposes of illustration, it will be evident to those skilled in the art that numerous variations of the details may be made without departing from the invention as defined in the appended claims.

I claim:

1. A method of electrochemically treating a continuous length of battery plate stock comprising,
   providing a forming tank for receiving said continuous length of plate stock,
   introducing said continuous length of plate stock into said forming tank,
   positioning plate stock portions of one polarity in relative spaced relationship with respect to plate stock portions of the same said polarity without interposed material of the opposite polarity,
   introducing forming acid into the spaces between said portions during said forming processes, and
   forming said plate stock in said forming tank.

2. A method of electrochemically treating battery plate stock comprising,
   providing a forming tank for receiving said plate stock,
   introducing said plate stock into said forming tank,
   employing a coil as said plate stock in said forming process,
   positioning plate stock portions of one polarity in relative spaced relationship with respect to plate stock portions of the same said polarity without interposed material of the opposite polarity,
   introducing forming acid into the spaces between said portions during said forming processes,
   said spaces being gaps between adjacent wraps of said coil, and
   forming said plate stock in said forming tank.

3. The method of claim 2 including,
   positioned forming means of opposite polarity from said coil in spaced relationship with an edge of said coil during said forming process.

4. The method of claim 3 including,
   employing an electrode as said forming means.

5. The method of claim 3 including,
   employing a coil of battery plate stock as said forming means.

6. The method of claim 3 including,
   positioning said forming means about 0.010 to 1 inch from said coil edge.

7. The method of claim 2 including,
   supporting said coil on electrically conductive support means.

8. The method of claim 7 including,
   providing said support means with openings for passage of forming acid therethrough.

9. The method of claim 2 including,
   effecting electrical contact with said coil at a plurality of locations.

10. The method of claim 9 including,
    effecting said electrical contact at edges of said coil.

11. The method of claim 3 including,
    subsequent to said forming washing and drying said battery plate stock.

12. The method of claim 11 including,
    severing said stock into a plurality of battery 13. The method of claim 12 including,
    employing said plates in the manufacture of a lead acid battery.

14. The method of claim 2 including,
    creating said plate stock with a grid portion, a lug portion, a bottom border portion, and applying a paste layer thereto.

15. The method of claim 4 including,
    employing two said electrodes with one disposed in spaced relationship with respect to each edge of said coil.

16. The method of claim 14 including,
    effecting electrical contact with said lug portion.

17. The method of claim 3.
    employing said gaps for passage of gases generated during forming.

18. The method of claim 5 including,
    positioning said coils with their respective axes oriented in generally the same direct on.

19. The method of claim 18 including,
    positioning said axes in generally aligned relationships.

20. The method of claim 2 including,
    providing said coil as a continuous length of battery plate stock.

21. The method of claim 3 including,
    an electrically insulating separator disposed between said forming means and said coil.

22. The method of claim 2 including,
    a porous, acid-absorbing material disposed between wraps of said coil.

23. The method of claim 5 including,
    employing as said forming a pair of said coils of identical polarity disposed on opposite sides of said coil of plate stock.

24. A coil of battery plate stock comprising,
    said coil being an electrochemically formed continuous length of battery plate stock, and
    said coil being of a single polarity, whereby said coil may be severed into a plurality of individual battery plates and employed in batteries without subsequent forming.

25. The coil of battery plate stock of claim 24 including,
    said coil being of positive polarity.

26. The coil of battery plate stock of claim 24 including,
   said coil being of negative polarity.
27. The coil of battery plate stock of claim 25 including,
   said coil being composed of lead dioxide.
28. The coil of battery plate stock of claim 27 including,
   said coil being composed of lead sponge.

* * * * *

UNITED STATES PATENT AND TRADEMARK OFFICE
CERTIFICATE OF CORRECTION

PATENT NO. : 5,001,025

DATED : March 19, 1991

INVENTOR(S) : MICHAEL V. ROSE and NORMAN BAGSHAW

It is certified that error appears in the above-identified patent and that said Letters Patent is hereby corrected as shown below:

Column 10, line 3, "is" should be --in--.

Claim 12, column 12, line 22, --plates.-- should be inserted after "battery".

Claim 17, column 12, line 37, "claim 3." should be --claim 3,--.

Claim 18, column 12, line 42, "direct on" should read --direction--.

Signed and Sealed this

Sixteenth Day of November, 1993

Attest:

BRUCE LEHMAN

Attesting Officer

Commissioner of Patents and Trademarks